(12) United States Patent
Toyooka et al.

(10) Patent No.: US 10,627,962 B2
(45) Date of Patent: Apr. 21, 2020

(54) PROJECTOR

(71) Applicant: SEIKO EPSON CORPORATION, Tokyo (JP)

(72) Inventors: Takashi Toyooka, Matsumoto (JP); Shingo Wakimoto, Azumino (JP); Akio Murakami, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/916,197

(22) Filed: Mar. 8, 2018

(65) Prior Publication Data

US 2018/0275832 A1  Sep. 27, 2018

(30) Foreign Application Priority Data

Mar. 24, 2017  (JP) .................................. 2017-059315

(51) Int. Cl.
*G06F 3/042*   (2006.01)
*H04N 9/31*    (2006.01)
*G06F 3/041*   (2006.01)

(52) U.S. Cl.
CPC .......... *G06F 3/0425* (2013.01); *G06F 3/0418* (2013.01); *H04N 9/3135* (2013.01); *H04N 9/3179* (2013.01); *H04N 9/3194* (2013.01)

(58) Field of Classification Search
CPC ... G06F 3/0418; G06F 3/0425; H04N 9/3135; H04N 9/3179
See application file for complete search history.

(56) References Cited

U.S. PATENT DOCUMENTS

| 2003/0090597 A1* | 5/2003 | Katoh | H04N 9/3111 348/744 |
| 2011/0154233 A1* | 6/2011 | Lamarca | G06F 3/0425 715/764 |
| 2013/0249790 A1* | 9/2013 | Takasu | G06F 3/017 345/156 |

FOREIGN PATENT DOCUMENTS

JP    2008-152622 A    7/2008

* cited by examiner

*Primary Examiner* — Stacy Khoo
(74) *Attorney, Agent, or Firm* — Oliff PLC

(57) ABSTRACT

A projector includes an image forming unit, a projection unit, an image capturing unit, and a detection unit. The image forming unit generates projection image data based on a video signal. The projection unit projects a projection image based on the projection image data, on a projection surface. The image capturing unit generates captured image data by capturing an image of the projection surface for each line or for each block. The detection unit detects an object other than the projection image, which included in the captured image data, based on the captured image data and the projection image data. The projection unit switches projection image for each line or for each block, by scanning. The image capturing unit starts sequential image capturing from a region of the projection surface, in which switching is completed, during a period when at least switching of the projection image is performed.

4 Claims, 9 Drawing Sheets

PROJECTOR

BACKGROUND

1. Technical Field

The present invention relates to a projector.

2. Related Art

A technology of specifying position coordinates of a pointer such as a finger in a manner that a projection image is captured by one or a plurality of cameras and the captured image is analyzed is known. There is a problem in that, when the captured image is analyzed, the projection image included in the captured image functions as noise and thus reproduction of the captured image is disturbed. Until now, a technology of specifying a pointed position by performing difference processing between the captured image and the projection image is proposed (for example, JP-A-2008-152622). In this technology, the captured image and the projection image are stored in a frame memory, and then timings of both the images are caused to coincide with each other in a frame unit.

However, in the related art, there is a problem in that crosstalk in which images of frames before and after the projection image are included in the captured image occurs.

SUMMARY

An advantage of some aspects of the invention is to solve at least a part of the problems described above, and the invention can be implemented as the following configurations.

According to an aspect of the invention, a projector is provided. The projector includes an image forming unit, a projection unit, an image capturing unit, and a detection unit. The image forming unit generates projection image data based on a video signal. The projection unit projects a projection image based on the projection image data, on a projection surface. The image capturing unit generates captured image data by capturing an image of the projection surface for each line or for each block. The detection unit detects an object other than the projection image, which is included in the captured image data, based on the captured image data and the projection image data. The projection unit switches the projection image for each line or for each block, by scanning. The image capturing unit starts sequential image capturing from a region of the projection surface, in which switching is completed, during a period when at least switching of the projection image is performed.

According to the projector of this aspect, since the image capturing unit starts sequential image capturing from a region of the projection surface, in which switching is completed, during a period when at least switching of projection image is performed, it is possible to suppress an occurrence of crosstalk of images of frames before and after the projection image, which occurs by switching the projection image in the process of image capturing.

In the projector according to the aspect, the detection unit may detect the object for each region of the projection surface and sequentially start the detection from a region of which image capturing is completed. According to the projector of the aspect with this configuration, since the detection sequentially starts from a region of which image capturing is completed, it is possible to suppress an occurrence of delay until a captured image is processed.

According to another aspect of the invention, a projector is provided. The projector includes an image forming unit, a projection unit, an image capturing unit, and a detection unit. The image forming unit generates projection image data based on a video signal. The projection unit projects a projection image based on the projection image data, on a projection surface. The image capturing unit that generates captured image data by capturing an image of the projection surface. The detection unit detects an object other than the projection image, which is included in the captured image data, based on the captured image data and the projection image data. The projection unit switches a projection image by scanning. The image capturing unit performs image capturing during a period when switching of the projection image by the projection unit is not performed.

According to the projector of this aspect, since the image capturing unit performs image capturing during a period when switching of the projection image by the projection unit is not performed, it is possible to suppress an occurrence of crosstalk of images of frames before and after the projection image, which occurs by switching the projection image in the process of image capturing.

In the projector according to the aspect, the detection unit may detect an object from an image obtained by background removal processing, after the background removal processing of removing the projection image data from the captured image data is performed. According to the projector of the aspect with this configuration, it is possible to detect an object from an image after the background removal processing.

The invention can be realized by various forms other than the projector. For example, the invention can be realized by a control method of the projector or a form such as an interactive projection system.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Exemplary Embodiment

Figure 1:
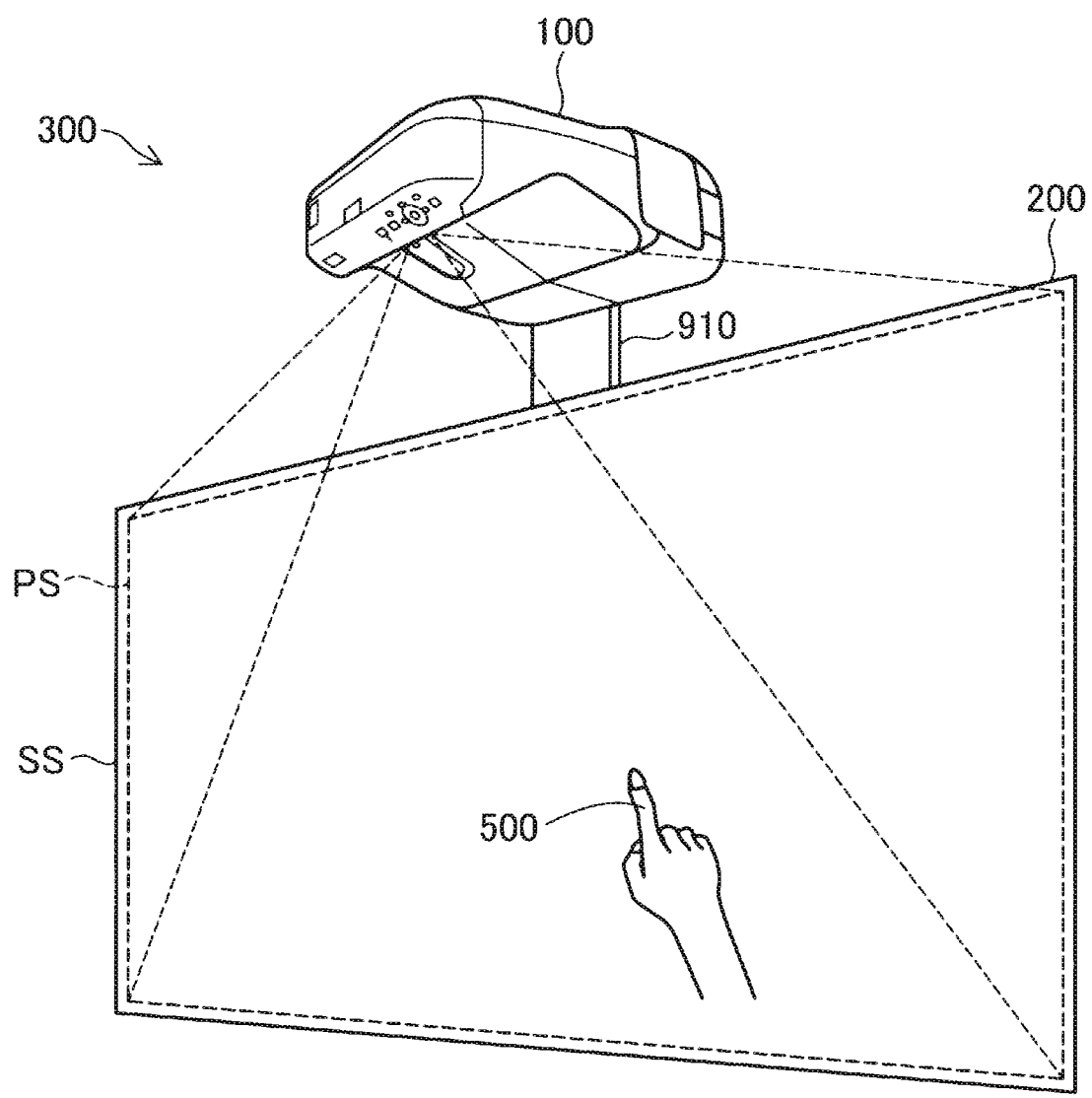
FIG. 1 is a perspective view illustrating a projector system according to a first exemplary embodiment of the invention.

FIG. 1 is a perspective view illustrating a projector system 300 according to a first exemplary embodiment of the invention. The system 300 includes a projector 100 and a projection plate 200. One surface of the projection plate 200 is used as a projection surface SS. In the exemplary embodiment, the projector 100 is fixed to an upper portion of the projection plate 200 by a supporting member 910.

The projector 100 projects a projection image PS on the projection surface SS. Generally, the projection image PS includes an image (drawing image) drawn in the projector 100. In a case where the drawing image is not provided in the projector 100, the projection image PS is irradiated with light from the projector 100, and thus a white image is displayed. In this specification, the projection surface SS means a surface of a member, on which an image is projected. The projection image PS means a region of an image projected on the projection surface SS by the projector 100. Generally, the projection image PS is projected on a portion of the projection surface SS.

The projector 100 also captures an image of the projection surface SS. The projector 100 detects an object (for example, finger 500) other than the projection image PS, by comparing the captured image and the projected image. The projector 100 is an interactive projector that performs an input operation by a user, based on position information of the detected finger 500. In this exemplary embodiment, an operation by the finger 500 is described. For example, an operation by a pen type pointer is also possible.

Figure 2:
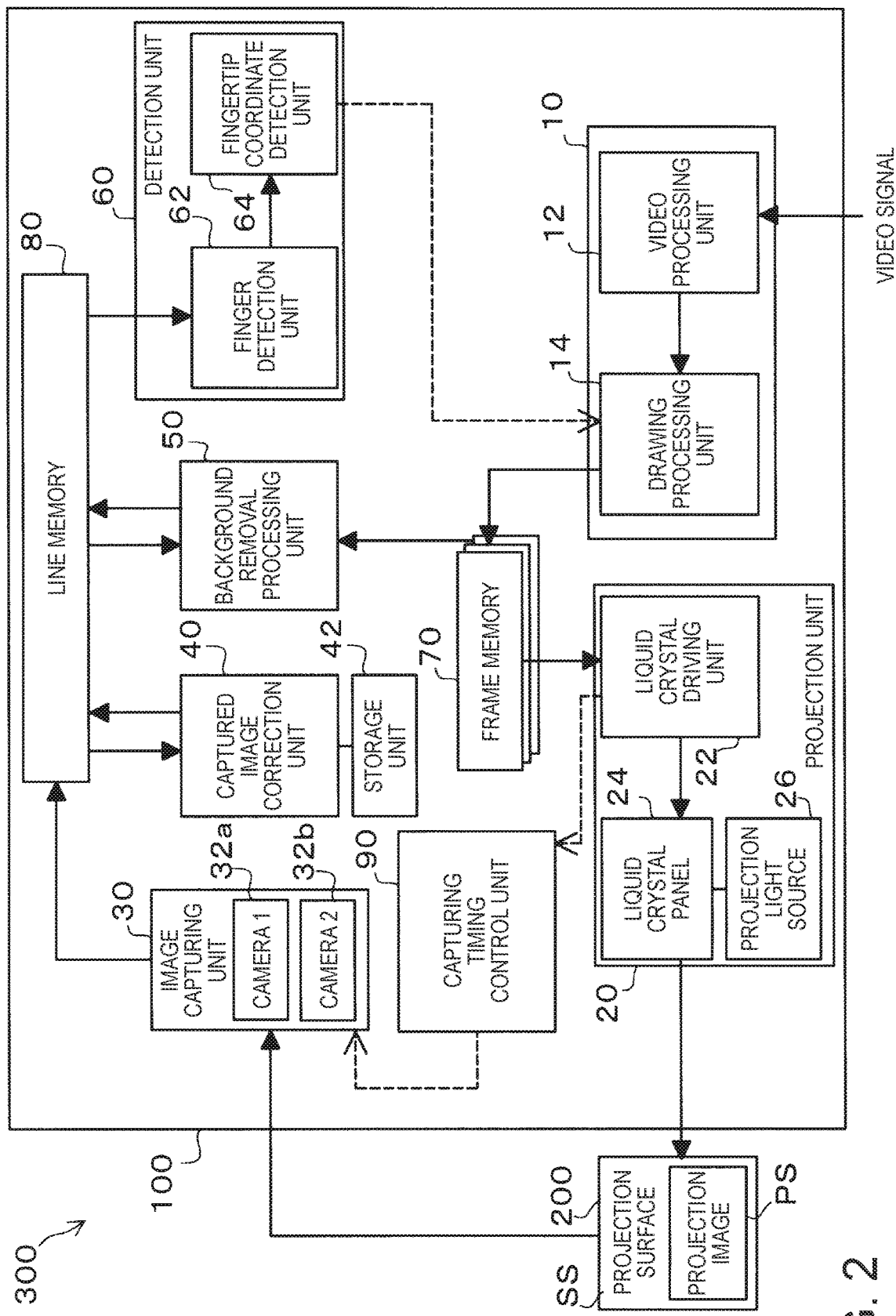
FIG. 2 is a block diagram illustrating a configuration of the projector system.

FIG. 2 is a block diagram illustrating an internal configuration of the projector 100. The projector 100 includes an image forming unit 10, a projection unit 20, an image capturing unit 30, a captured image correction unit 40, a background removal processing unit 50, a detection unit 60, a frame memory 70, a line memory 80, and a capturing timing control unit 90.

The image forming unit 10 includes a video processing unit 12 and a drawing processing unit 14. The image forming unit 10 generates projection image data based on the input video signal. Specifically, the video signal is subjected to video processing by the video processing unit 12. For example, color correction or high image quality processing may be used as the video processing. The video signal subjected to the video processing is subjected to drawing processing by the drawing processing unit 14. The drawing processing is, for example, processing of performing an instruction (drawing, selection of a tool, or the like) of a user based on pointed position information which will be described later. The projection image data generated by the image forming unit 10 is stored in the frame memory 70.

The frame memory 70 is a volatile memory in which a plurality of storage areas are provided. The frame memory 70 may store plural pieces of projection image data. In this exemplary embodiment, the frame memory 70 may store three types of projection image data. The three types of projection image data are projection image data which will be projected next, projection image data which is being projected at present, and projection image data which has been projected before. The frame memory 70 is connected to the projection unit 20 and the background removal processing unit 50 so as to cause the projection unit 20 and the background removal processing unit 50 to read projection image data. The frame memory 70 may switch a storage area to be connected to each of the image forming unit 10, the projection unit 20, and the background removal processing unit 50. The number of the storage areas of frame memories 70 may be randomly changed.

The projection unit 20 projects a projection image PS onto the projection surface SS, based on projection image data stored in the frame memory 70. The projection unit 20 includes a liquid crystal driving unit 22, a liquid crystal panel 24, and a projection light source 26. The liquid crystal driving unit 22 sequentially reads pieces of projection image data stored in the frame memory 70 and drives the liquid crystal panel 24. The liquid crystal driving unit 22 drives the liquid crystal panel 24 alternately between the positive polarity and the negative polarity, so as to suppress an occurrence of burn-in of the liquid crystal panel 24. The liquid crystal driving unit 22 controls the liquid crystal panel 24 to display the projection image PS by progressive scanning. The liquid crystal driving unit 22 generates a driving timing signal indicating a timing for driving the liquid crystal panel 24, and transmits the generated driving timing signal to the capturing timing control unit 90. The projection light source 26 is realized by, for example, a halogen lamp and a laser diode. A drawing image drawn in the liquid crystal panel 24 based on the projection image data is projected onto the projection surface SS by the projection light source 26. Instead of the liquid crystal panel 24, other light modulation devices such as a digital mirror device may be used.

In this exemplary embodiment, the projection unit switches the projection image PS by line progressive scanning. That is, depiction onto the liquid crystal panel 24 is performed for each one line, and a line at which drawing is performed is sequentially updated in a scanning direction which is perpendicular to a line direction. Instead of line progressive scanning, block progressive scanning may be employed. In a case which will be described later, drawing to the liquid crystal panel 24 is performed for each one block which is configured by a plurality of lines.

The capturing timing control unit 90 is connected to the liquid crystal driving unit 22 and the image capturing unit 30. The capturing timing control unit 90 generates a capturing timing signal based on the driving timing signal generated by the liquid crystal driving unit 22. The generated capturing timing signal is transmitted from the capturing timing control unit 90 to the image capturing unit 30.

The image capturing unit 30 captures an image of an image capturing region MR (FIG. 3 which will be described later) including the projection surface SS, and thus generates captured image data. The image capturing unit 30 is connected to the capturing timing control unit 90 and the line memory 80. The image capturing unit 30 includes two cameras 32a and 32b. A timing for image capturing by the image capturing unit is controlled based on the capturing timing signal transmitted from the capturing timing control unit 90, and is controlled so as to cause the image capturing unit 30 to drive with synchronization with driving of the projection unit 20.

As the cameras 32a and 32b, a rolling shutter type camera in which an exposure period is sequentially shifted for each line or for each block in a screen is employed. The "block" means a region configured by a plurality of lines. If the image capturing region MR is divided into a plurality of regions, each of the cameras 32a and 32b opens a shutter for each of the divided regions, so as to start sequential exposure. Each of the cameras 32a and 32b closes the shutter in a region of which exposure has early started, so as to end sequential exposure. Each of the cameras 32a and 32b sequentially outputs captured image data corresponding to the region of which the exposure has been ended, to the line memory 80. In this exemplary embodiment, the cameras 32a and 32b are cameras which perform image capturing by receiving light in a visible region, and may be cameras using light in a region (for example, near-infrared region) other than the visible region. The number of cameras 32a and 32b provided in the image capturing unit 30 is not limited to two. For example, one camera may be provided, or three or more cameras may be provided. In the following descriptions, in a case where there is no need to distinguish the two cameras 32a and 32b from each other, the cameras 32a and 32b are collectively referred to as "a camera 32".

The captured image correction unit 40 is connected to a storage unit 42 and the line memory 80. The storage unit 42 is a non-volatile memory. The captured image correction unit 40 takes in pieces of captured image data which have been sequentially output to the line memory 80 by the image capturing unit 30. The captured image correction unit 40 sequentially performs correction processing on the taken pieces of captured image data. The correction processing is, for example, processing of correcting distortion of captured image data based on calibration information stored in the storage unit 42 and of adjusting the number of pixels of the captured image data so as to coincide with the number of pixels of projection image data. When the correction processing is performed, captured image data of the surrounding region, which is stored in the line memory 80 is also used in addition to captured image data to be subjected to the correction processing. The captured image correction unit 40 outputs captured image data (corrected captured image) after the correction processing is performed, to the line memory 80. A memory which allows storing of data corresponding to lines of which the number is smaller than the number of lines corresponding to one screen of the camera 32 is used as the line memory 80. For example, the number of lines for the line memory 80 may be set to be equal to or smaller than 1/10 of the number of lines for the camera 32. The number of lines required as storage capacity of the line memory 80 is determined in accordance with a method of the correction processing in the captured image correction unit 40 or detection processing in the detection unit 60.

The background removal processing unit 50 is connected to the frame memory 70 and the line memory 80. The background removal processing unit 50 sequentially takes in corrected captured images which have been sequentially output to the line memory 80 by the captured image correction unit 40. The background removal processing unit 50 sequentially performs background removal processing on the corrected captured images which have been taken in. Specifically, the background removal processing unit 50 reads the corrected captured image and a portion of a projection image data, from the frame memory 70. Then, the background removal processing unit 50 removes the background by difference processing between the projection image PS and the read captured image data. The portion of the projection image data corresponds to data in the projection image data at positions of pixels corresponding to the corrected captured image. In this exemplary embodiment, as the background removal processing, the difference processing performed by simple subtraction is employed, but it is not limited thereto. The background removal processing may be a method of removing a background image based on a comparison between the projection image PS and the captured image. For example, processing of comparing images captured by the first camera 32a and the second camera 32b may be added. If the background removal processing is completed, the background removal processing unit 50 outputs captured image data (captured image after removal) after the background removal processing, to the line memory 80.

The detection unit 60 is connected to the line memory 80 and the drawing processing unit 14. The detection unit 60 detects the finger 500 included in the captured image after removal, and transmits pointed position information as a detection result, to the drawing processing unit 14. The detection unit 60 includes a finger detection unit 62 and a fingertip coordinate detection unit 64.

The finger detection unit 62 detects a finger region by a template matching method. The finger region is a region in which the finger 500 is included in the captured image data. In the template matching method, the captured image after removal is compared to a template image which has been previously prepared. In a case where the finger 500 is detected, the finger detection unit 62 transmits a detection result to the fingertip coordinate detection unit 64. The finger detection unit 62 detects the finger 500 in a unit of a region which is smaller than the entirety of the projection image PS. The finger detection unit 62 may sequentially take in pieces of captured image data from the line memory 80 and sequentially start the detection from a region of which image capturing is completed.

The fingertip coordinate detection unit 64 obtains the center of gravity of the finger region, and thus calculates coordinates (fingertip coordinates) of the tip of the finger 500 in the captured image data. The fingertip coordinate detection unit 64 calculates fingertip position information which is three-dimensional coordinates which are obtained by actual pointing of the finger 500. The fingertip position information is calculated based on the fingertip coordinates in each piece of captured image data of the first camera 32a and the second camera 32b, by using the principle of triangulation. The calculated fingertip position information is transmitted from the fingertip coordinate detection unit 64 to the drawing processing unit 14.

In a case where the driving timing signal is not correctly output from the liquid crystal driving unit 22, the detection unit 60 may not perform the detection processing. In a case where the driving timing signal is not correctly output, a video is not correctly projected due to some reasons. Thus, erroneous fingertip position information may be obtained. Thus, in this case, if the detection processing is set not to be performed, it is possible to prevent performing of erroneous drawing processing using erroneous fingertip position information.

Figure 3:
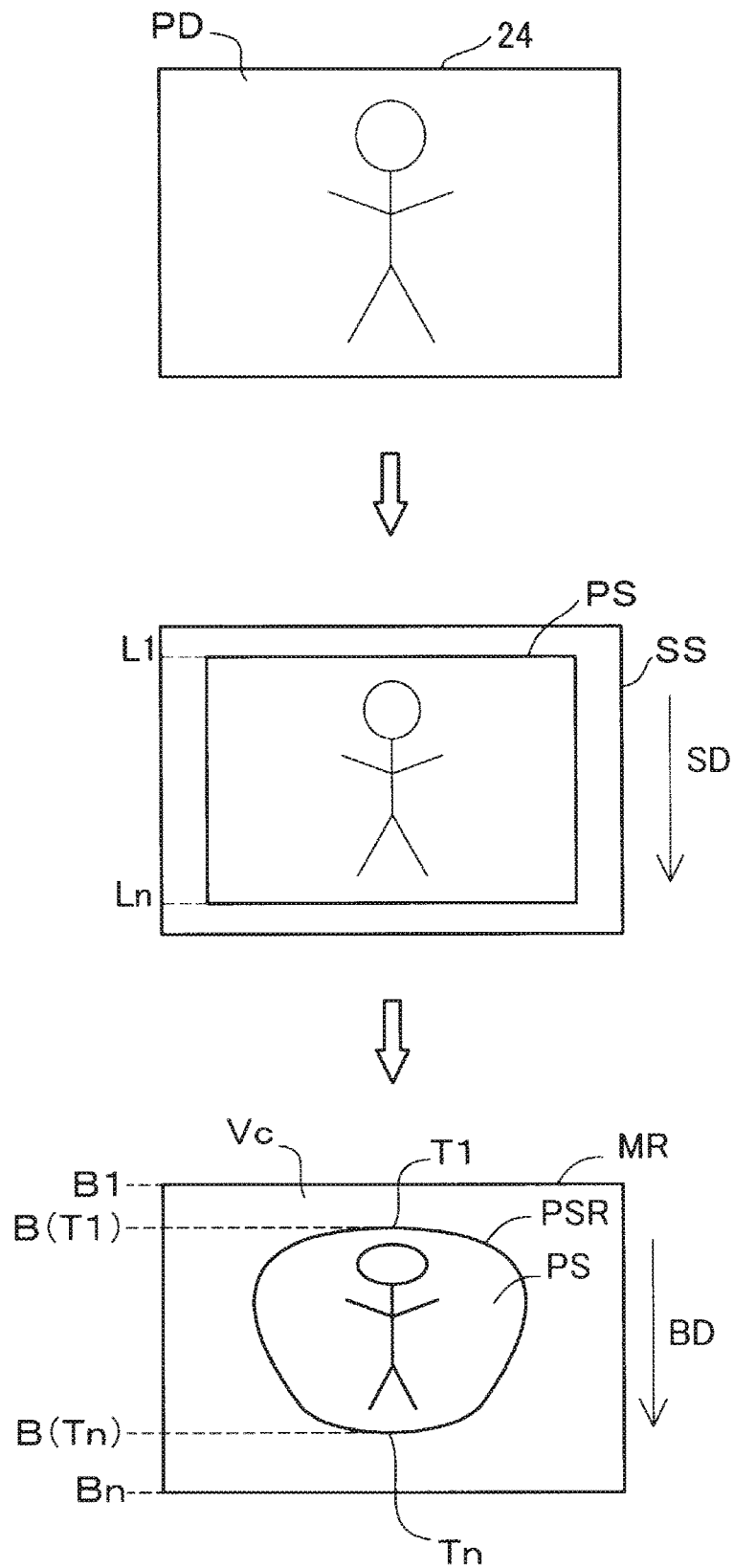
FIG. 3 is a diagram illustrating a relationship between projection image data, a projection image, and a captured image.

FIG. 3 is a diagram illustrating a relationship between projection image data PD displayed in the liquid crystal panel 24, projection image PS on the projection surface SS, and a captured image Vc. The projector 100 projects a rectangular projection image PS on the projection surface SS. Thus, the projection image PS and the projection image data PD are images similar to each other. The captured image Vc obtained by the camera 32 is an image obtained by capturing an image of the image capturing region MR. The image capturing region MR is a region which includes the projection surface SS and thus is wider than the projection surface SS. A projection image region PSR in the captured image Vc, in which the projection image PS is captured includes barrel distortion based on trapezoidal distortion which is caused in an image capturing direction, and distortion aberration of an imaging lens. In this exemplary embodiment, only the projection image region PSR in the captured image Vc is cut out by the correction processing which is performed by the captured image correction unit 40 (FIG. 2), and then is converted into image data having the number of pixels, which is equal to that of the projection image PS.

When the liquid crystal panel 24 displays the projection image PS, the liquid crystal panel 24 performs display by line progressive scanning. The projection image PS projected on the projection surface SS is also switched in accordance with scanning of the liquid crystal panel 24. The projection image PS is sequentially switched from a line L1 positioned on the top side toward a line Ln positioned on the bottom side. A direction from the line L1 toward the line Ln is referred to as a projection scanning direction SD. When the projection image PS is switched, a region in which an image before switching is displayed and a region in which an image after switching is displayed are provided. If image capturing is performed by the camera 32 during a period when regions in which different images are displayed are respectively provided, crosstalk may occur.

As described above, a rolling shutter type camera is employed as the camera 32, and the camera 32 captures an image of the projection image PS for each line or for each block. The camera 32 moves a region in which sequential exposure starts, in a capturing scanning direction BD indicated by an arrow. The capturing scanning direction BD is controlled to be parallel to the projection scanning direction SD of the projection image PS captured in the projection image region PSR. For example, when calibration information is acquired, a positional relationship between the projection unit 20 and the image capturing unit 30 may be acquired, and the capturing scanning direction BD may be calculated based on the acquired positional relationship. For example, in the disposition illustrated in FIG. 1, both the projection scanning direction SD and the capturing scanning direction BD are directions from an upper part of the projection surface SS toward a lower part thereof. In a case where the disposition in FIG. 1 is made upside down and the projector 100 performs projection from the lower part of the projection surface SS, the projection scanning direction SD and the capturing scanning direction BD are also inverted directions of those in a case of the disposition in FIG. 1. A line on the most upstream side of the capturing scanning direction BD in the image capturing region MR is referred to as a line B1. A line on the most downstream side thereof is referred to as a line Bn. A line which includes an end portion T1 of the projection image region PSR on an upstream side of the capturing scanning direction BD and is perpendicular to the capturing scanning direction BD is referred to as a line B(T1). A line which includes an end portion Tn of the projection image region PSR on a downstream side of the capturing scanning direction BD and is perpendicular to the capturing scanning direction BD is referred to as a line B(Tn).

Figure 4:
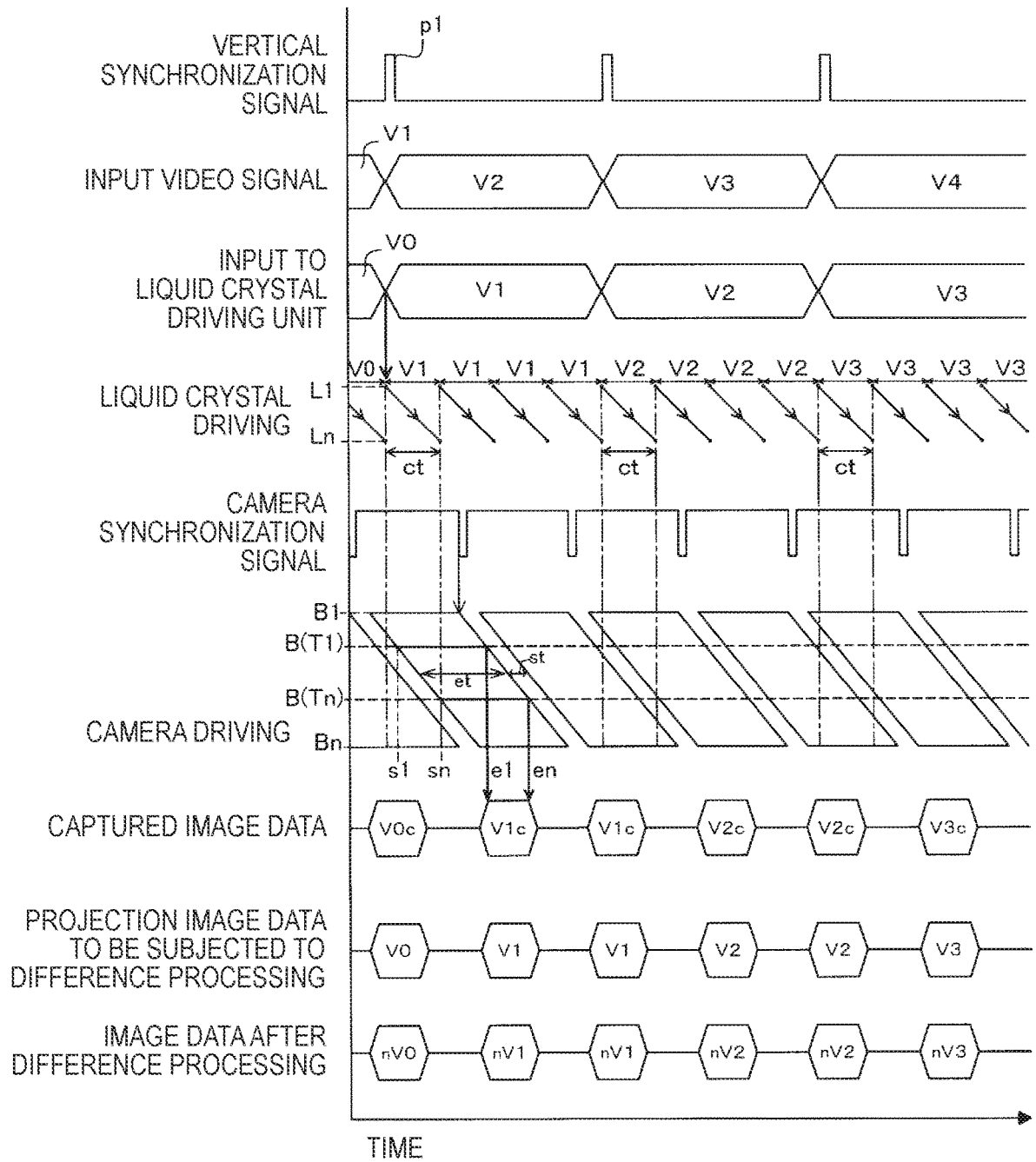
FIG. 4 is a timing chart illustrating an operation from when a video signal of a projector is input until background removal processing is completed.

FIG. 4 is a timing chart of an operation from when a video signal of the projector 100 is input until the background removal processing is completed. V1 to V4 in FIG. 4 are pieces of image data which correspond to 4 frames and are projected as the projection image PS. V0c to V3c are pieces of captured image data obtained by capturing images of the projection images PS when the pieces of image data V0 to V3 are projected, respectively. nV0 to nV3 are pieces of image data obtained by performing the difference processing (background removal processing) on the pieces of captured image data V0c to V3c, respectively. A crosstalk time ct refers to a period when switching of the projection image PS is performed and to a period when crosstalk may occur.

The projector 100 operates based on a vertical synchronization signal which is input at a frequency of 60 Hz, for example. A video signal input to the projector 100 and projection image data input to the liquid crystal driving unit 22 from the frame memory 70 are switched with synchronization with the vertical synchronization signal. For example, if the projector 100 receives a vertical synchronization signal p1, the input video signal is switched from V1 to V2 and the projection image data input to the liquid crystal driving unit 22 is switched from V0 to V1.

The liquid crystal panel 24 is driven at a frequency of the quadruple of the vertical synchronization signal of an input video. If a video signal input from the frame memory 70 is switched, the liquid crystal panel 24 changes a drawing image to be displayed. For example, if the projection image data input to the liquid crystal driving unit 22 is switched from V0 to V1, liquid crystal driving is sequentially switched from V0 to V1, from the line L1. The reason that liquid crystal driving is expressed by an arrow which descends obliquely in FIG. 4 is because that the arrow indicates that the liquid crystal panel 24 drives by line progressive scanning. In this exemplary embodiment, liquid crystal driving is performed at a speed of the quadruple of that of the vertical synchronization signal. The speed of the liquid crystal driving may be integer multiple of the frequency of the vertical synchronization signal, and it is not limited to the quadruple. The liquid crystal driving may be performed with switching driving polarity for each one screen.

The camera 32 is driven based on a camera synchronization signal. If the camera synchronization signal is switched from an L level to a H level, the camera 32 starts sequential exposure from the line B1 (FIG. 3). If the camera synchronization signal is switched from the H level to the L level, the camera 32 sequentially closes the shutter from the line B1 on the upper side, and ends exposure. Specifically, image capturing at the line B(T1) is started at a time point s1. A predetermined exposure time et elapses from the time point s1. Then, if time reaches a time point e1, the image capturing is completed. The exposure time et is set so as to allow two times of image capturing in a display time of an input video corresponding to one frame. Image capturing at the line B(Tn) is started at a time point sn. The exposure time et elapses from the time point sn. Then, if the time reaches a time point en, the image capturing is completed. For the lines B1 to Bn at which exposure is completed, sequential image capturing is started after a shutter time st which is a time when exposure is not performed elapses. The shutter time st is set to be a time having a length which allows opening and closing of the shutter of the camera 32.

At the lines B(T1) to B(Tn) which include the projection image PS among the lines B1 to Bn, if the camera 32 ends exposure, captured image data is output to the line memory 80 for each one line. For example, captured image data for the line B(T1) is output at a time point e1, and captured image data for the line B(Tn) is output at a time point en.

If the captured image data is output to the line memory 80, projection image data corresponding to the captured image data is read from the frame memory 70, and the difference processing is performed. For example, if image data for the line B(T1) is output at the time point e1, image data of a position in the projection image data, which corresponds to the line B(T1) is read from the frame memory 70, and the difference processing is performed.

In this exemplary embodiment, the reason that two times of image capturing are performed in a display time of an input video corresponding to one frame is to perform high dynamic range (HDR) imaging. For example, the exposure time et is set to have different values in the first image capturing and the second image capturing, and captured images Vc obtained by two times of image capturing are composited. Thus, it is possible to obtain an image having a wide dynamic range. In a case where HDR imaging is not performed, once of image capturing may be performed in a display time of an input video corresponding to one frame.

Figure 5:
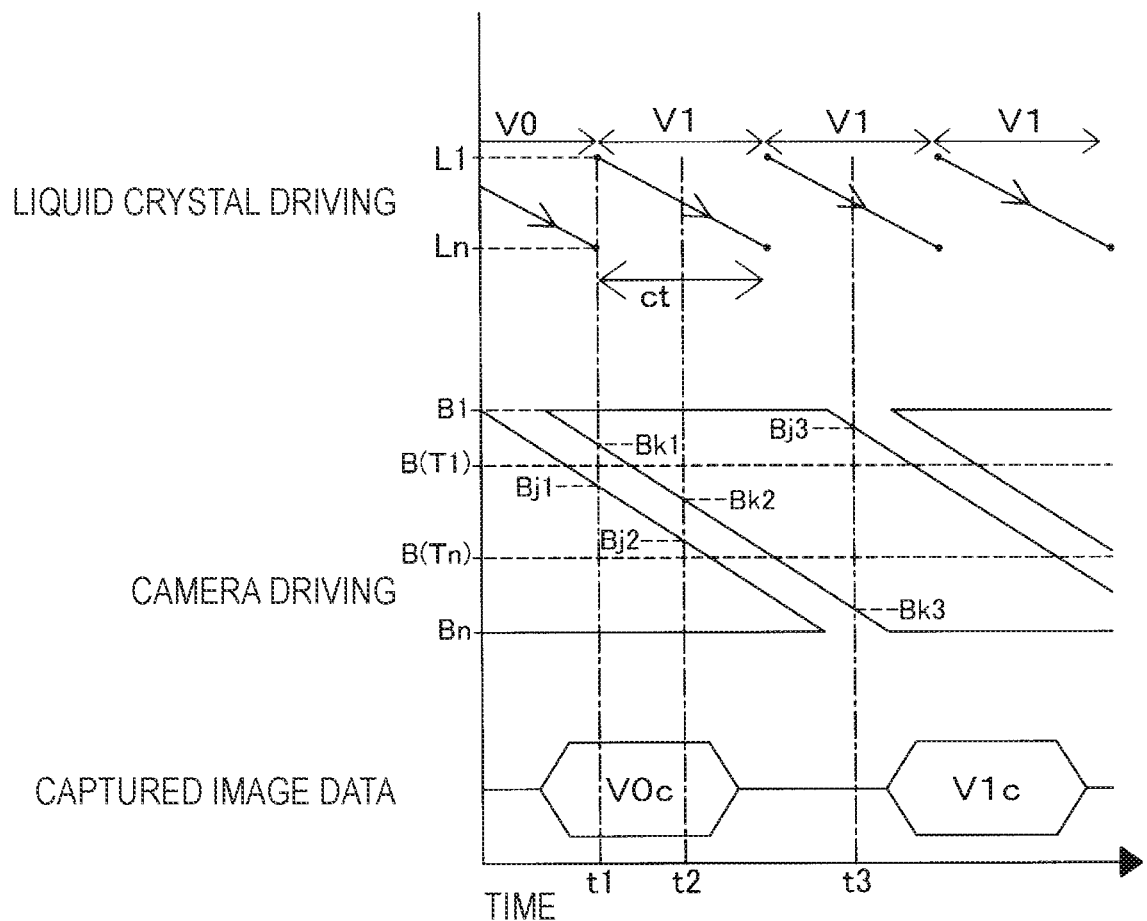
FIG. 5 is an enlarged diagram illustrating a selected portion of the timing chart.
Figure 6:
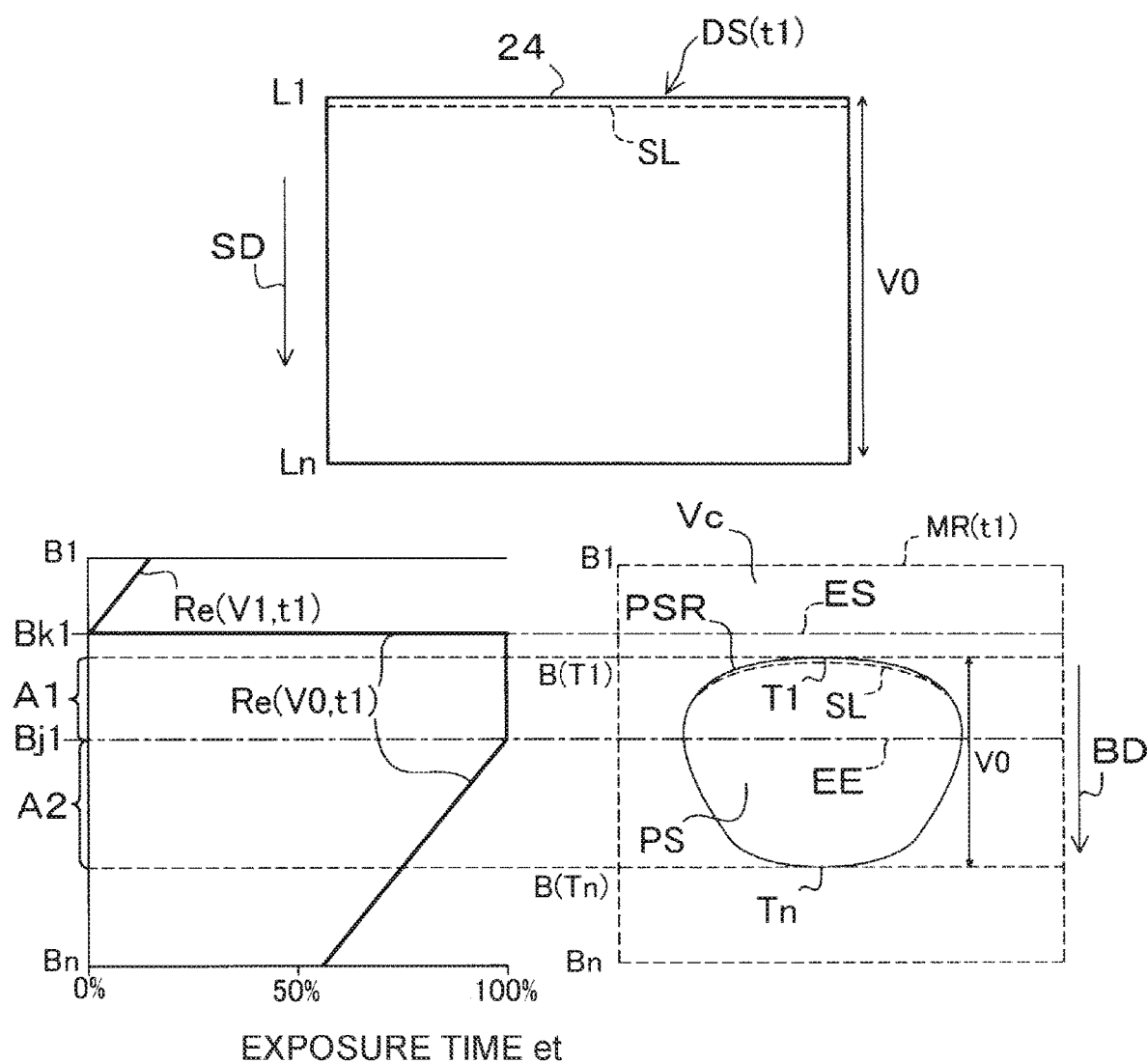
FIG. 6 is a diagram illustrating liquid crystal driving and driving of a camera at a time point t1 illustrated in FIG. 5.
Figure 7:
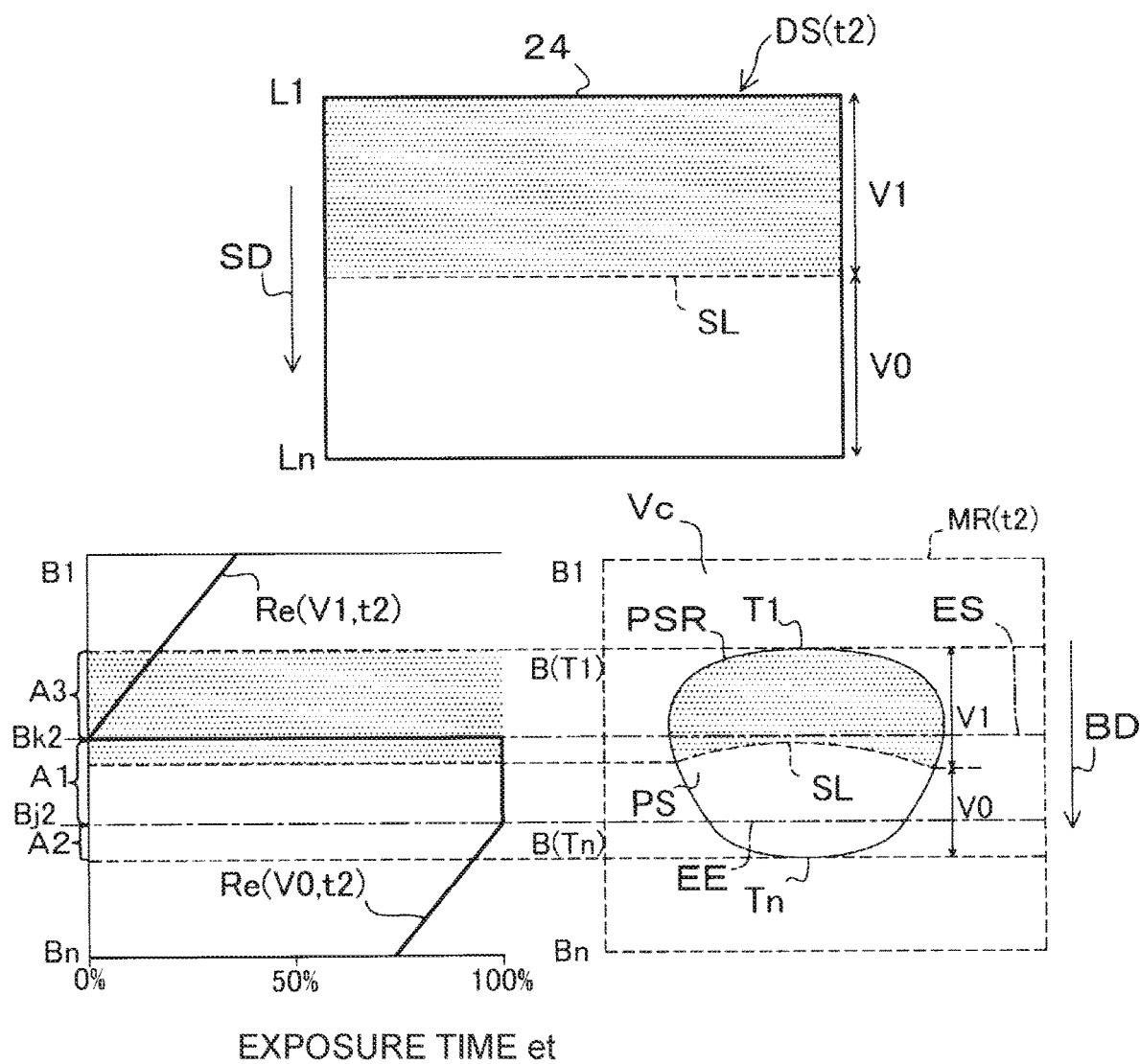
FIG. 7 is a diagram illustrating the liquid crystal driving and the driving of the camera at a time point t2 illustrated in FIG. 5.
Figure 8:
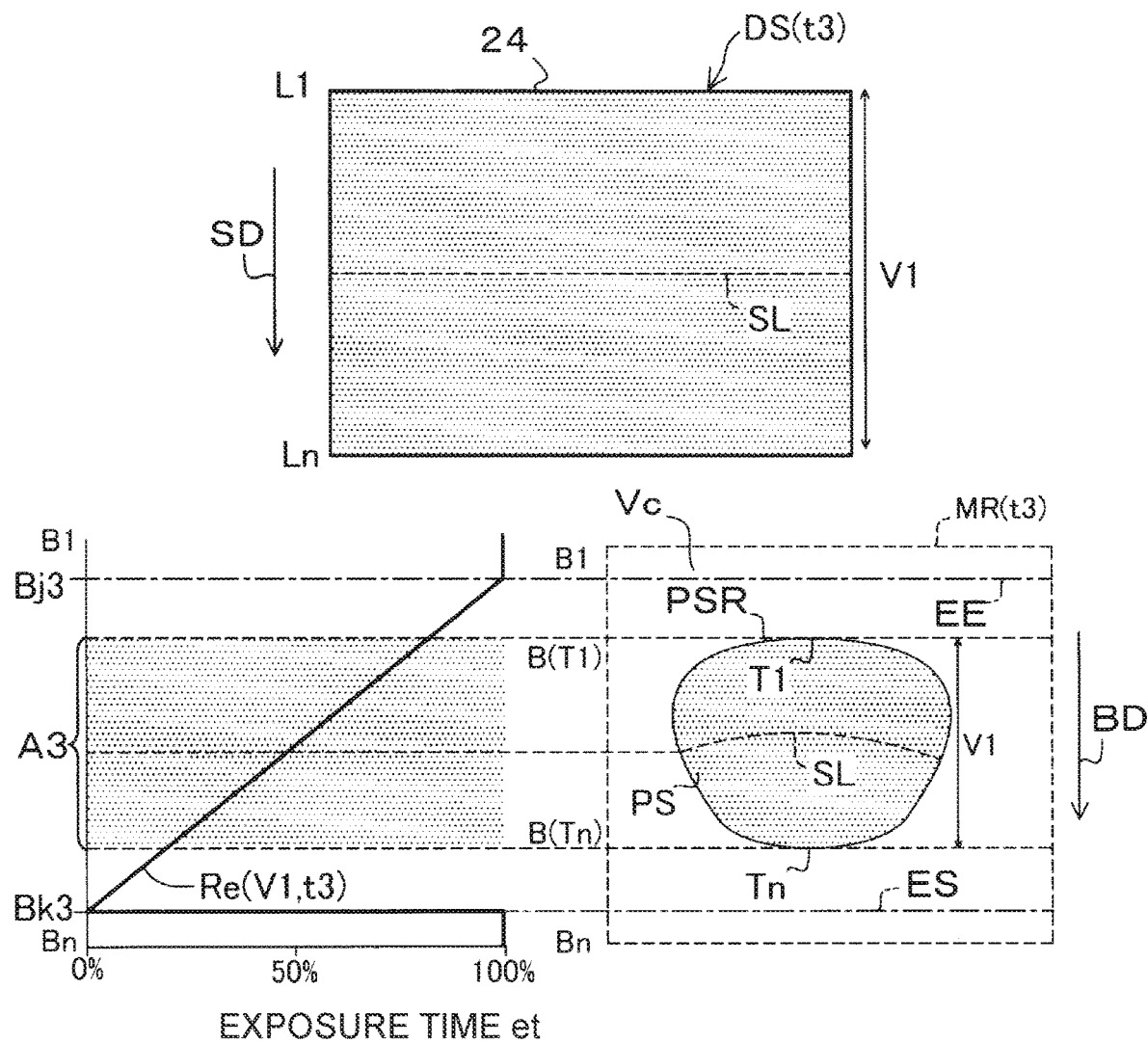
FIG. 8 is a diagram illustrating the liquid crystal driving and the driving of the camera at a time point t3 illustrated in FIG. 5.

FIG. 5 is a diagram illustrating an enlarged portion of the timing chart. FIGS. 6 to 8 are diagrams illustrating the liquid crystal driving and driving of the camera 32 at time points t1, t2, and t3 illustrated in FIG. 5.

As illustrated in FIG. 5, switching of an image drawn in the liquid crystal panel 24 from V0 to V1 is started at the time point t1. At the time point t1, regarding lines of the line B1 to a line Bj1, exposure of the camera 32 for an image V0 is 100% completed. Regarding lines on a lower side of the line Bj1, exposure for the image V0 is in progress. Regarding lines from the line B1 to a line Bk1, exposure for the next image V1 is started. The position of a line (referred to as a "current drawing line SL") at which switching of an image in the liquid crystal panel 24 is started is the position of the line L1. FIG. 6 illustrates a drawing state DS(t1) of the liquid crystal panel 24 at the time point t1, an image capturing region MR(t1) in a case of being viewed through the lens of the camera 32, and a graph of exposure ratios Re(V0, t1) and Re(V1, t1) of the camera 32 for each of the lines B1 to Bn. The exposure ratio Re(V0, t1) is an exposure ratio regarding the image V0, at the time point t1. Similarly, the exposure ratio Re(V1, t1) is an exposure ratio regarding the image V1, at the time point t1. In FIG. 6, in the image capturing region MR(t1), an exposure start line ES at which exposure by the camera 32 is started is positioned on an upstream side of the current drawing line SL, and an exposure end line EE is positioned on a downstream side of the current drawing line SL. The current drawing line SL is positioned in a region A1 which is a region interposed between the exposure end line EE and the exposure start line ES. The region A1 is a region in which exposure regarding the image V0 is 100% completed. A region A2 between the exposure end line EE and the line B(Tn) at a lower end in a region including the projection image region PSR is a region in which exposure regarding the image V0 is in progress.

As illustrated in FIG. 5, about the half of the image drawn in the liquid crystal panel 24 is switched from the image V0 to the image V1 at the time point t2. At the time point t2, regarding lines of the line B1 to a line Bj2, exposure of the camera 32 for an image V0 is 100% completed. Regarding lines on a lower side of the line Bj2, exposure for the image V0 is in progress. Regarding lines from the line B1 to a line Bk2, exposure for the next image V1 is started. FIG. 7 illustrates a drawing state DS(t2) of the liquid crystal panel 24 at the time point t2, an image capturing region MR(t2) in a case of being viewed through the lens of the camera 32, and a graph of exposure ratios Re(V0, t2) and Re(V1, t2) of the camera 32 for each of the lines B1 to Bn. The position of the current drawing line SL in the liquid crystal panel 24 is a position in the vicinity of the center of the liquid crystal panel 24. In FIG. 7, hatching is applied to a region in which the image V1 is displayed. In FIG. 7, in the image capturing region MR(t2), an exposure start line ES at which exposure by the camera 32 is started is positioned on an upstream side of the current drawing line SL, and an exposure end line EE is positioned on a downstream side of the current drawing line SL. The current drawing line SL is positioned in a region A1 which is a region interposed between the exposure end line EE and the exposure start line ES. Thus, the current drawing line SL of the image V1 is positioned at a position at which image capturing for the image V0 is ended. Exposure for the image V0 is in the process, in a region A2 on the downstream side of the current drawing line SL. Exposure for the next image V1 is started, in a region A3 on the upstream side of the current drawing line SL.

In the crosstalk time ct illustrated in FIG. 5, the current drawing line SL moves with tracking a position (exposure end line EE) at which exposures is completed, and a position (exposure start line ES) at which exposure starts moves with tracking the current drawing line SL. That is, the projection image PS is sequentially switched from a region of which exposure is ended and image capturing is completed, and sequential exposure is started from a region in which switching of the projection image PS is completed.

As illustrated in FIG. 5, the image drawn in the liquid crystal panel 24 is totally switched to the image V1 at a time point t3. At the time point t3, regarding lines from a line Bj3 to a line Bk3, exposure for the image V1 is in progress. FIG. 8 illustrates a drawing state DS(t3) of the liquid crystal panel 24 at the time point t3, an image capturing region MR(t3) in a case of being viewed through the lens of the camera 32, and a graph of the exposure ratio Re(V1, t3) of the camera 32 for each of the lines B1 to Bn. The position of the current drawing line SL in the liquid crystal panel 24 is in the vicinity of the center of the liquid crystal panel 24. In the image capturing region MR(t3), exposure for the image V1 is in the process, in the region A3 between the line B(T1) and the line B(Tn). The current drawing line SL is positioned in the region A3, and the image of which exposure is in the process is switched. However, since the entirety of the liquid crystal panel 24 is already and completely switched to the image V1, the projection image region PSR is not changed. Accordingly, crosstalk does not occur.

As described above, regarding each of the lines B(T1) to B(Tn) at which the projection image PS is captured, only single image is displayed during a period when exposure is performed.

According to the above-described first exemplary embodiment, the image capturing unit 30 starts sequential image capturing from a region of the projection surface SS, in which switching is completed, during the crosstalk time ct which is a period when at least switching of the projection image PS is performed. Thus, the image capturing unit 30 is controlled not to switch a projection image PS which is in the process of being captured, and can suppress the occurrence of crosstalk by images of frames before and after the corresponding image. Accordingly, in the projector 100, it is possible to reduce noise in the captured image Vc and to compare the projection image PS and the captured image Vc to each other with high grade.

In the first exemplary embodiment, sequential detection is started from a region of which image capturing is completed. Thus, it is possible to suppress the occurrence of delay until the captured image is processed. As a result, it is easy to detect a pointed position in real time.

In this exemplary embodiment, image capturing can also be performed in a period between crosstalk times ct. Thus, it is possible to increase the exposure time et in comparison to that in a case where image capturing is not performed in a period between the crosstalk times ct.

Since the projector 100 performs two times of image capturing during a period of one frame, it is possible to acquire two captured images Vc for the same projection image PS. In this case, it is possible to perform HDR imaging by using the two captured images Vc. Accordingly, it is possible to extend the gradation of the captured image Vc in comparison with that in a case where one captured image for one projection image PS is acquired.

Driving of the image capturing unit 30 is controlled by the capturing timing signal based on the driving timing signal generated by the liquid crystal driving unit 22. Therefore, in a case where the projection unit 20 does not normally operate, the driving of the image capturing unit 30 is suspended. Accordingly, it is possible to suppress erroneous operation when the projection image PS is not displayed.

B. Second Exemplary Embodiment

A projector 100 according to a second exemplary embodiment is different from the first exemplary embodiment in that the camera 32 provided in the image capturing unit 30 is a global shutter type. In the global shutter type camera, image capturing (exposure) for the entirety of the image capturing region simultaneously starts, and image capturing is simultaneously ended. Other components are similar to those in the first exemplary embodiment.

Figure 9:
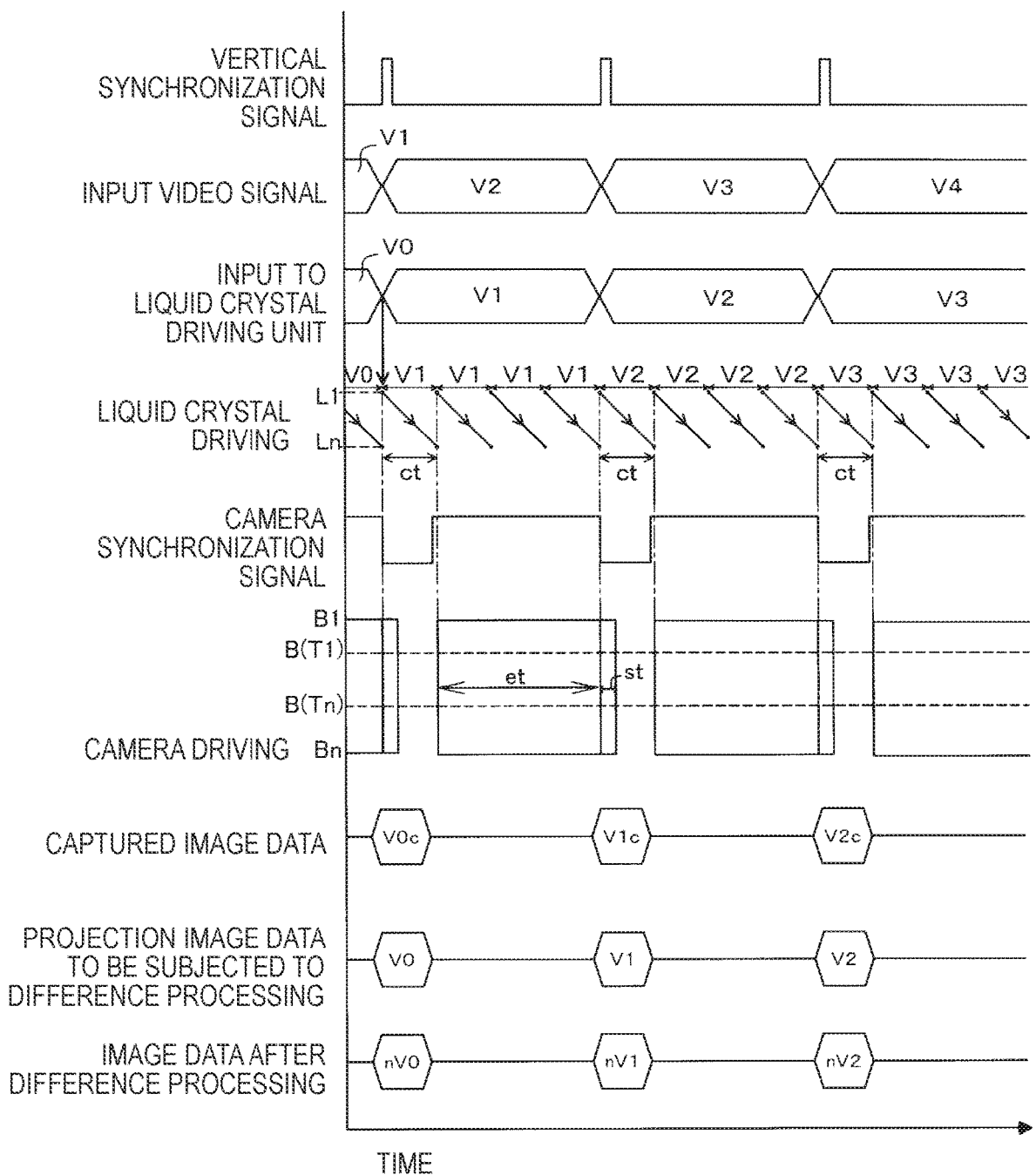
FIG. 9 is a timing chart according to a second exemplary embodiment.

FIG. 9 is a timing chart in the second exemplary embodiment. The projector 100 does not perform image capturing during a period between crosstalk times ct. The projector 100 performs once of image capturing during a period when images corresponding to one frame are drawn 4 times. The projector 100 starts image capturing after the crosstalk time ct is finished, and ends the image capturing before the next crosstalk time ct starts. Since other kinds of driving are similar to those in the first exemplary embodiment, descriptions thereof will not be repeated.

The above-described projector 100 according to the second exemplary embodiment performs image capturing during a period when switching of a projection image PS by the projection unit 20 is not performed, that is, a period other than the crosstalk time ct. Thus, it is possible to suppress an occurrence of a situation in which the projection image PS which is in the process of being captured is switched, and thus crosstalk occurs by images of frames before and after the corresponding image. Accordingly, in the projector 100, it is possible to reduce noise in the captured image Vc and to compare the projection image PS and the captured image Vc to each other with high grade. As in the first exemplary embodiment, even in a case where the camera 32 of a rolling shutter type is used, image capturing may be performed during a period other than the crosstalk time ct.

The invention is not limited to the above-described exemplary embodiments, and can be realized with various configurations in a range without departing from the gist of the invention. For example, technical features in the example corresponding to the technical features in the aspects described in the section of the summary can be suitably replaced or combined in order to solve some or all of the above-described problems or to achieve some or all of the above-described effects. The technical features can be suitably deleted so long as it is not described that the technical features are necessary.

The entire disclosure of Japanese Patent Application No. 2017-059315, filed Mar. 24, 2017 is expressly incorporated by reference herein.

What is claimed is:

1. A method for controlling a projector comprising:
   generating projection image data based on a video signal;
   projecting a projection image based on the projection image data, on a projection surface by a projection unit;
   generating captured image data by capturing an image of the projection surface for each line or for each block by an image capturing unit; and
   detecting an object other than the projection image, which is included in the captured image data, based on the captured image data and the projection image data,
   wherein the projection unit switches the projection image for each line or for each block, by scanning, and
   the image capturing unit starts sequential image capturing from a region of the projection surface, in which switching is completed, during a period when at least switching of the projection image is performed.

2. The method for controlling the projector according to claim 1, further comprising:
   detecting the object for each region of the projection surface sequentially from a region of which image capturing is completed.

3. A method for controlling a projector comprising:
   generating projection image data based on a video signal;
   projecting a projection image based on the projection image data by a plurality of scanning in a frame, on a projection surface by a projection unit;
   generating captured image data by capturing an image of the projection surface by an image capturing unit; and
   detecting an object other than the projection image, which is included in the captured image data, based on the captured image data and the projection image data,
   wherein the projection unit switches the projection image by first scanning in the frame, and
   the image capturing unit performs image capturing during a period from second scanning to last scanning in the frame by the projection unit.

4. The method for controlling the projector according to claim 1, further comprising:
   detecting the object from an image obtained by background removal processing, after the background removal processing of removing the projection image data from the captured image data is performed.

* * * * *